United States Patent [19]

Druecke et al.

[11] Patent Number: 6,139,675

[45] Date of Patent: *Oct. 31, 2000

[54] PROCESS OF MANUFACTURING A WATER-BASED ADHESIVE BONDED, SOLVENT RESISTANT PROTECTIVE LAMINATE

[75] Inventors: Frank Gerald Druecke, Oshkosh, Wis.; Peter Klaus Hölzer, Winningen, Germany; Peter Maddern, Clwyd, United Kingdom

[73] Assignee: Kimberly-Clark Worldwide, Inc., Neenah, Wis.

[ * ] Notice: This patent issued on a continued prosecution application filed under 37 CFR 1.53(d), and is subject to the twenty year patent term provisions of 35 U.S.C. 154(a)(2).

[21] Appl. No.: 08/680,890

[22] Filed: Jul. 16, 1996

Related U.S. Application Data

[63] Continuation of application No. 08/361,275, Dec. 21, 1994, abandoned, which is a continuation-in-part of application No. 08/172,362, Dec. 22, 1993, abandoned.

[51] Int. Cl.$^7$ ..................................................... B32B 31/00
[52] U.S. Cl. .......................... 156/277; 2/243.1; 428/201; 442/398; 442/381; 524/572
[58] Field of Search ..................................... 156/277, 324, 156/331.4; 428/201, 246; 524/572; 2/243.1

[56] References Cited

U.S. PATENT DOCUMENTS

| | | |
|---|---|---|
| 2,976,182 | 3/1961 | Caldwell et al. . |
| 3,235,589 | 2/1966 | Berenbaum et al. ..................... 524/572 |
| 3,463,690 | 8/1969 | Converse et al. ........................ 156/324 |
| 3,488,211 | 1/1970 | Morrison et al. . |
| 3,666,594 | 5/1972 | Condon et al. . |
| 3,695,967 | 10/1972 | Ross . |
| 4,041,203 | 8/1977 | Brock et al. . |
| 4,142,017 | 2/1979 | Blackburn et al. . |
| 4,206,007 | 6/1980 | Force . |
| 4,303,712 | 12/1981 | Woodroof . |
| 4,338,371 | 7/1982 | Dawn et al. . |
| 4,374,888 | 2/1983 | Bornslaeger . |
| 4,379,192 | 4/1983 | Wahlquist et al. . |
| 4,433,026 | 2/1984 | Molde . |
| 4,443,511 | 4/1984 | Worden et al. . |
| 4,454,191 | 6/1984 | von Bilcher et al. . |
| 4,493,870 | 1/1985 | Vrouenraets et al. . |
| 4,526,577 | 7/1985 | Schmidt, Jr. et al. . |
| 4,539,255 | 9/1985 | Sato et al. . |
| 4,539,256 | 9/1985 | Shipman . |
| 4,663,377 | 5/1987 | Hombach et al. ...................... 524/572 |
| 4,705,717 | 11/1987 | Cain et al. . |
| 4,713,068 | 12/1987 | Wang et al. . |
| 4,725,481 | 2/1988 | Ostapchenko . |
| 4,758,239 | 7/1988 | Yeo et al. . |
| 4,772,310 | 9/1988 | McClure . |
| 4,828,556 | 5/1989 | Braun et al. . |
| 4,833,010 | 5/1989 | Langley . |
| 4,847,142 | 7/1989 | Twilley et al. . |
| 4,855,178 | 8/1989 | Langley . |
| 4,857,393 | 8/1989 | Kato et al. . |
| 4,863,788 | 9/1989 | Bellairs et al. . |
| 4,867,881 | 9/1989 | Kinzer . |
| 4,871,600 | 10/1989 | Amann . |
| 4,871,611 | 10/1989 | LeBel . |
| 4,872,220 | 10/1989 | Haruvy et al. ........................... 2/243.1 |
| 4,876,293 | 10/1989 | Dumey et al. . |
| 4,898,761 | 2/1990 | Dunaway et al. . |
| 4,908,260 | 3/1990 | Dodia et al. . |
| 4,935,287 | 6/1990 | Johnson et al. . |
| 4,943,473 | 7/1990 | Sahatjian et al. . |
| 4,943,475 | 7/1990 | Baker et al. . |
| 4,970,105 | 11/1990 | Smith, Jr. . |
| 4,975,469 | 12/1990 | Jacoby et al. . |
| 4,981,738 | 1/1991 | Farnworth et al. . |
| 4,983,450 | 1/1991 | Yanagihara et al. . |
| 5,024,594 | 6/1991 | Athayde et al. . |
| 5,043,209 | 8/1991 | Boisse et al. . |
| 5,082,721 | 1/1992 | Smith, Jr. et al. . |
| 5,110,506 | 5/1992 | Ciallella . |
| 5,114,787 | 5/1992 | Chaplin et al. . |
| 5,139,841 | 8/1992 | Makoui et al. . |
| 5,169,712 | 12/1992 | Tapp ...................................... 428/317.9 |
| 5,187,005 | 2/1993 | Stahle et al. . |
| 5,190,806 | 3/1993 | Nomi . |
| 5,204,156 | 4/1993 | Lumb et al. . |
| 5,208,098 | 5/1993 | Stover . |
| 5,208,313 | 5/1993 | Krishnan . |
| 5,234,525 | 8/1993 | Krishnan . |
| 5,409,761 | 4/1995 | Langley . |
| 5,560,974 | 10/1996 | Langley . |

FOREIGN PATENT DOCUMENTS

| | | |
|---|---|---|
| 234435 | 4/1986 | German Dem. Rep. . |
| 8023893 | 2/1981 | Germany . |
| 54-011216 | 1/1979 | Japan . |
| 59-159338 | 9/1984 | Japan . |
| 62-028475 | 2/1987 | Japan . |
| 62-064833 | 3/1987 | Japan . |
| 63-276533 | 5/1987 | Japan . |
| 2-276636 | 11/1990 | Japan . |
| 1352139 | 5/1974 | United Kingdom . |
| 1419948 | 12/1975 | United Kingdom . |
| 1511070 | 5/1978 | United Kingdom . |

*Primary Examiner*—John J. Gallagher
*Attorney, Agent, or Firm*—Pauley Petersen Kinne & Fejer

[57] ABSTRACT

Disclosed is a process of manufacturing a water-based adhesive bonded, solvent resistant protective laminate utilizing the steps of: providing a film having a first surface and a second surface; depositing a discontinuous coating of a cross-linkable; carboxylated styrene-butadiene rubber latex adhesive on the first surface of the film, the latex adhesive containing an effective amount of a cross-linking agent; joining a fibrous nonwoven web into intimate bonding contact with the film and adhesive; and removing water from the adhesive thereby causing cross-linking at reactive sites. The adhesive may be deposited utilizing gravure printing techniques and is desirably deposited at a rate greater than about 2 grams per square meter of film. Also disclosed is an adhesively bonded, solvent resistant protective laminate produced by the process. The film component of the laminate may be composed of a thermoset polymer or a thermoplastic polymer. The film may also be microporous or microapertured. The nonwoven fibrous web component may be selected from bonded carded webs, spunbonded webs, webs of meltblown fibers, multi-ply fibrous webs containing the same type of fibrous web, and multi-ply fibrous webs containing different types of fibrous webs.

104 Claims, 1 Drawing Sheet

FIG. 1

PROCESS OF MANUFACTURING A WATER-BASED ADHESIVE BONDED, SOLVENT RESISTANT PROTECTIVE LAMINATE

This application is a continuation application of U.S. patent application Ser. No. 08/361,275 entitled "Process of Manufacturing a Water-Based Adhesive Bonded, Solvent Resistant Protective Laminate" filed in the U.S. Patent and Trademark Office on Dec. 21, 1994 which is a continuation-in-part of U.S. patent application Ser. No. 08/172,362, filed on Dec. 22, 1993, both now abandoned.

FIELD OF THE INVENTION

This invention relates to laminates of films and nonwoven materials and a process to prepare such laminates.

BACKGROUND OF THE INVENTION

There are many types of limited use or disposable protective fabrics designed to provide barrier properties. One type of protective barrier fabric is a laminate of a film and a nonwoven material. Such materials can be used to effectively seal off a wearer from a harmful environment in ways that conventional textiles and/or nonwoven materials are unable to do.

Disposable protective fabrics should be resistant to liquids and solvents. For a variety of reasons, it is undesirable for hazardous substances and/or pathogens which may be in liquid form or carried by liquids or aerosols to pass through a protective fabric to contact persons working in an environment where such hazards are present.

After use, it is usually quite costly to decontaminate protective clothing that has been exposed to a harmful or hazardous substance. Thus, it is important that a protective garment be inexpensive so as to be disposable.

Generally speaking, inexpensive laminates can be made from films and fibrous nonwoven materials. In some cases, these laminates may be adapted to provide useful barrier properties. Although the nonwoven fibrous web component of the laminate may provide some barrier properties, it is usually the film component which serves to block penetration of the laminate by hazardous substances.

One problem associated with laminate construction is poor inter-ply attachment (i.e., bonding between the plies which holds the laminate together). Thermal bonding is one way to attach plies but is problematic if the plies are formed of incompatible materials. Combinations of thermoset materials and thermoplastic materials are usually unsuited for thermal bonding. Thermal bonding may also be difficult to accomplish when certain combinations of polymer materials are used. For example, low density polyethylene films have proven relatively difficult to bond to polypropylene fibrous nonwoven webs. Thermal bonding presents other problems when relatively thin films are used. It can be difficult to bond thin films without damage which may impair their barrier properties. This has economic implications since the film is often the most expensive component of the laminate. Reducing the film thickness would help reduce cost.

As another example, some types of microporous and/or microapertured films often have latent internal stresses resulting from the microporous and/or microapertured film manufacturing processes. These internal stresses can render such films susceptible to shrinkage when exposed to temperatures capable of softening the films. Such exposure may occur during many types of conventional bonding processes to join these specialized films to other materials. Shrinkage of these films is highly undesirable because it can affect the barrier and/or breathability of the films, cause gathering or puckering of the film, and/or increase the amount of film required to produce a given area of laminate material.

Adhesives may be used to join the layers of the laminate. Solvent-based adhesives can present environmental and safety problems because they contain volatile organic compounds. During laminating and drying, large amounts of solvent vapor may create exposure hazards and could be subject to environmental regulations. On the other hand, water-based adhesives may fail to provide adequate inter-ply attachment. Water-based adhesives may also have inadequate resistance to solvents. Whether solvent-based or water-based, the adhesives must be suited for the high-speed manufacture of protective barrier fabrics at such low cost that may be economical to discard the fabric after only a single use. In conventional processes that use water-based adhesives to bond materials, the materials and adhesive are exposed to heat in order to cause or speed up drying, curing or setting of the adhesive. The levels of heat required are typically unsuitable for temperature sensitive films.

Thus, a need exists for a practical process for making an inexpensive limited use or disposable water-based adhesive bonded, solvent resistant protective film/nonwoven protective laminate having desirable barrier properties and which is tough, durable, and lightweight. This need also extends to a practical method of making such a laminate which utilizes a water-based adhesive. This need further extends to a practical method of making such a laminate which utilizes a water-based adhesive and which is suitable for temperature-sensitive materials. Meeting this need is important since it is both economically and environmentally desirable to substitute water-based adhesives for solvent-based adhesives thereby avoiding the need for expensive solvent recovery equipment to control emissions of volatile organic compound into the work-place or outside environment. There is also a need for an inexpensive, limited use or disposable water-based adhesive bonded, solvent resistant protective film/nonwoven laminate designed to provide barrier properties. There is also a need for an inexpensive limited use or disposable water-based adhesive bonded, solvent resistant protective film/nonwoven laminate having desirable barrier properties and which is tough, durable, and lightweight. For example, a need exists for an inexpensive, limited use or disposable water-based adhesive bonded protective film/nonwoven laminate that resists liquids, is durable and conformable, has useful levels of inter-ply attachment even after exposure to solvents and/or solvent vapors and which has practical applications in protective apparel.

DEFINITIONS

As used herein, the term "nonwoven web" refers to a web that has a structure of individual fibers or filaments which are interlaid, but not in an identifiable repeating manner. Nonwoven webs have been, in the past, formed by a variety of processes known to those skilled in the art such as, for example, meltblowing, spunbonding and various bonded carded web processes.

As used herein, the term "spunbonded web" refers to a web of small diameter fibers and/or filaments which are formed by extruding a molten thermoplastic material as filaments from a plurality of fine, usually circular, capillaries in a spinnerette with the diameter of the extruded filaments then being rapidly reduced, for example, by non-eductive or eductive fluid-drawing or other well known spunbonding mechanisms. The production of spunbonded nonwoven webs is illustrated in patents such as Appel, et al., U.S. Pat. No. 4,340,563; Dorschner et al., U.S. Pat. No. 3,692,618; Kinney, U.S. Pat. Nos. 3,338,992 and 3,341,394; Levy, U.S. Pat. No. 3,276,944; Peterson, U.S. Pat. No. 3,502,538; Hartman, U.S. Pat. No. 3,502,763; Dobo et al., U.S. Pat. No. 3,542,615; and Harmon, Canadian Patent No. 803,714.

As used herein, the term "meltblown fibers" means fibers formed by extruding a molten thermoplastic material through a plurality of fine, usually circular, die capillaries as molten threads or filaments into a high-velocity gas (e.g. air) stream which attenuates the filaments of molten thermoplastic material to reduce their diameters, which may be to microfiber diameter. Thereafter, the meltblown fibers are carried by the high-velocity gas stream and are deposited on a collecting surface to form a web of randomly disbursed meltblown fibers. The meltblown process is well-known and is described in various patents and publications, including NRL Report 4364, "Manufacture of Super-Fine Organic Fibers" by V. A. Wendt, E. L. Boone, and C. D. Fluharty; NRL Report 5265, "An Improved device for the Formation of Super-Fine Thermoplastic Fibers" by K. D. Lawrence, R. T. Lukas, and J. A. Young; and U.S. Pat. No. 3,849,241, issued Nov. 19, 1974, to Buntin, et al.

As used herein, the term "microfibers" means small diameter fibers having an average diameter not greater than about 100 microns, for example, having a diameter of from about 0.5 microns to about 50 microns, more specifically microfibers may also have an average diameter of from about 1 micron to about 20 microns. Microfibers having an average diameter of about 3 microns or less are commonly referred to as ultra-fine microfibers. A description of an exemplary process of making ultra-fine microfibers may be found in, for example, for example, U.S. Pat. No. 5,213,881, entitled "A Nonwoven Web With Improved Barrier Properties", incorporated herein by reference in its entirety.

As used herein the term "thermoset material" refers to a high polymer that solidifies or "sets" irreversibly when heated. This property is typically associated with a cross-linking reaction of the molecular constituents induced by heat or irradiation. Phenolics, alkyds, amino resins, some polyesters, epoxides, silicones and some polyurethanes are usually considered to be thermoset materials. The term is also meant to encompass materials where additive-induced cross-linking is possible (e.g. cross-linked natural rubber). Of course, the term "thermoset material" is also meant to include mixtures and combinations of two or more thermoset materials as well as mixtures and combinations which include at least fifty (50) percent, by weight, thermoset materials.

As used herein, the term "thermoplastic material" refers to a high polymer that softens when exposed to heat and returns to generally its unsoftened state when cooled to room temperature. Natural substances which exhibit this behavior are crude rubber and a number of waxes. Other exemplary thermoplastic materials include, without limitation, polyvinyl chlorides, some polyesters, polyamides, polyfluorocarbons, polyolefins, some polyurethanes, polystyrenes, polyvinyl alcohols, caprolactams, copolymers of ethylene and at least one vinyl monomer (e.g., poly (ethylene vinyl acetates), copolymers of ethylene and n-butyl acrylate (e.g., ethylene n-butyl acrylates), and cellulosic and acrylic resins.

As used herein, the term "water-based adhesive" refers to materials formulated into latexes or aqueous colloidal suspensions designed to have adhesive properties. An exemplary water-based adhesive is a carboxylated styrene-butadiene rubber latex which is susceptible to cross-linking by materials which form bonds with reactive sites in the rubber component of the latex. Useful cross-linking agents include, without limitation, conventional multi-functional isocyanate cross-linking agents.

As used herein, the term "disposable" is not limited to single use articles but also refers to articles that can be economically discarded if they become soiled or otherwise unusable after only a few uses.

As used herein, the term "coveralls" refers to protective apparel and/or shields including for example, but not limited to, coveralls, work suits and the like, as well as outer covers for specialized protective apparel. Generally speaking, coveralls are composed of a body portion having a neck opening in a shoulder line at its top; two sleeve portions extending from the body portion; and two leg portions extending from the body portion.

As used herein, the term "machine direction" refers to the planar dimension of a nonwoven fibrous web which is in the direction of travel of the forming surface onto which fibers are deposited during formation of the web.

As used herein, the term "cross-machine direction" refers to the planar dimension of a nonwoven fibrous web which is in the direction that is perpendicular to the machine direction defined above.

As used herein, the term "protective laminate" refers to a laminate composed of at least one layer of film and at least one layer of nonwoven material, the laminate having a useful level of resistance to penetration by liquid and/or particulates. Generally speaking, resistance to liquid penetration is measured by hydrostatic head tests, strike-through tests, water spray penetration tests and the like. Unless otherwise specified, a material with resistance to liquid penetration refers to material having a hydrostatic head of at least about 20 centimeters as determined in accordance with the standard hydrostatic pressure test AATCCTM No. 127-1977. For example, such a liquid resistant material may have a hydrostatic head of 95 centimeters or more. Resistance to penetration by particulates may be measured by determining the air filter retention of dry particles and can be expressed as a particle holdout efficiency. In particular, particle holdout efficiency refers to the efficiency of a material at preventing the passage of particles of a certain size range through the material. Particle holdout efficiency may be measured by determining the air filter retention of dry particles utilizing tests such as, for example, IBR Test Method No. E-217, Revision G (Jan. 15, 1991) performed by InterBasic Resources, Inc. of Grass Lake, Mich. Generally speaking, a high particle holdout efficiency is desirable for barrier fabrics. Desirably, protective laminates should resist penetration by a column of tap water of at least about 20 cm and/or should have a particle hold-out efficiency of at least about 40 percent for particles having a diameter greater than about 0.1 micron.

The protective laminate of the invention may also be characterized in terms of its barrier to synthetic blood and/or viruses. ASTM ES21-92, also known as, ASTM F1670-95, measures the ability of a fabric to withstand the passage of synthetic blood. The fabric is contacted with synthetic blood at zero psi for 5 minutes, than at 2 psi (13.6 kPa) for one minute, then at zero psi for 54 minutes. Desirably, the protective laminate of the invention exhibits no visible penetration of synthetic blood following this test. ASTM ES22-92, also known as ASTM F1671-95, provides a measure of viral barrier. The fabric is contacted with a ØX174 bacteriophage suspension at a titer of $10^8$ PFU/mL for five minutes with no applied pressure, then 1 minute at 2 psi, then 54 minutes at no applied pressure. Desirably, the protective laminate of the invention provides a barrier to viral penetration as measured by that test.

As used herein, the term "adhesion strength" refers to the relative level of bonding between two substances by surface attachment provided by an adherent. This strength is expressed as the peak load per unit width required to produce separation of discreet plies of a relatively flat, adhesively bonded laminate due to application of a peeling force. Generally speaking, adhesion strength is evaluated by a standard test for Peel Resistance of Adhesives (T-Peel Test). Unless otherwise specified herein, all samples are tested generally in accordance with ASTM D 1876-72 (Reapproved 1983). Testing of cross-linked, water-based adhesive bonded, solvent resistant protective laminates is typically conducted after substantial cross-linking has occurred. Samples may be tested after a specified exposure to environments which may degrade ply attachment. The test instrument is an Instron Model 4301 Universal Test Instrument. The Instron jaw is set to travel at a rate of 8 inches per minute. The results of testing (i.e., the adhesion strength) are reported in units of force per specified width of sample. For example, the adhesion strength can be reported in units of $grams_{force}$/centimeter or $ounces_{force}$/inch.

As used herein, the term "solvent resistant" refers to the ability of an adhesive bond between plies of material to maintain a desired level of adhesion strength after a specified exposure to liquid solvent and/or solvent vapor. Adhesion strength of a solvent resistant material is determined as described above except that each sample (or the length of sample to be tested) is completely immersed in a solvent for approximately five minutes immediately prior to testing. For most samples, about 250 to 200 milliters of liquid solvent in a 500 milliliter beaker is adequate. Generally speaking, a water-based adhesive bonded laminate material is solvent resistant if its adhesion strength after five (5) minutes immersion in a solvent is greater than about 75 grams (per two inch width of sample). Desirably, the adhesion strength will be greater than about 125 grams. More desirably, the adhesion strength will be greater than about 175 grams. In some situations, it has been found useful to express solvent resistance as a ratio between adhesion strength measured prior to solvent exposure (i.e., "dry state") and "solvent exposed" adhesion strength. In those situations, a water-based adhesive bonded laminate material is solvent resistant if its "solvent exposed" adhesion strength is at least 10 percent of the "dry state" adhesion strength required to cause destruction of the nonwoven during adhesion strength testing. That is, when fibers of the nonwoven web attached to the film become separated or pulled from the web during adhesion strength testing. Desirably, the laminate's "solvent exposed" adhesion strength is at least 20 percent of the "dry state" adhesion strength required to cause destruction of the nonwoven during adhesion strength testing. More desirably, the laminate's "solvent exposed" adhesion strength is at least 30 percent of the "dry state" adhesion strength required to cause destruction of the nonwoven during adhesion strength testing. Exemplary solvents include aliphatic hydrocarbons, aromatic hydrocarbons, low molecular weight alcohols, esters, ethers, ketones, amines and nitrated and/or chlorinated hydrocarbons. Exemplary liquids which are solvents or contain solvents include, but are not limited to, isopropyl alcohol, diesel oils, gasolines, ethyl alcohol, industrial oils, organic solvent based paints, aliphatic hydrocarbon parts cleaners, industrial degreasers, hot water, aqueous detergent solutions and aqueous ammonia solutions.

As used herein the term "aperture" refers to a generally linear hole or passageway. Aperture is to be distinguished from and does not include holes or passageways having the greatly tortuous path or passageways found in membranes. Holes or passageways having such characteristics are generally referred to as "pores".

As used herein the term "microaperture" refers to an aperture which has an area of less than about 100,000 square micrometers. The area of the microaperture is to be measured at the narrowest point in the linear passageway or hole.

As used herein, the term "temperature-sensitive" refers to the reaction of a material (e.g., a film) to a certain level of heat in the surrounding environment which causes an undesirable change in the material (e.g., shrinkage, blocking, blooming, or the like). For example, certain types of microporous films are manufactured by stretching a particulate loaded film to create permanent pores or openings about and/or around the particulates as the film permanently deforms. Such films may contain internal stresses that will relax upon exposure to a certain level of heat to cause shrinkage of the film.

As used herein, the term "temperature sufficiently low to avoid degrading the temperature-sensitive material" refers to a temperature at which a temperature-sensitive material (e.g., film) will shrink not more than a nominal amount (i.e., less than about 2 or 3 percent). Such a temperature may be measured for a particular material by placing a pre-measured sample of material flat on the bottom of a circulating air oven pre-heated to a specified temperature. After a specified period of exposure (e.g., one minute), the sample is removed from the oven, allowed to cool briefly and then re-measured. Areal shrinkage may then be calculated by dividing the area lost during the oven exposure by the original area and can be expressed as a percentage. Temperatures that fail to cause more than a nominal amount of shrinkage (i.e., less than about 2 or 3 percent) can be identified as temperatures sufficiently low to avoid degrading the temperature-sensitive material.

As used herein, the term "conformable" refers to material having measurable softness. A conformable material has softness characterized by a drape stiffness in at least one direction of less than about 2.75 cm. For example, a conformable material may have a drape stiffness in at least one direction from less than about 1.5 up to about 2.75 cm. Drape stiffness is determined using a stiffness tester available from Testing Machines, Amityville, Long Island, N.Y. 11701. Test results are obtained in accordance with ASTM standard test D1388-64 using the method described under Option A (Cantilever Test). A conformable material may have measurable softness which is characterized by cup crush test results of less than about 200 grams. For example, a conformable material may have cup crush test results from less than about 150 up to about 200 grams. The cup crush test evaluates film stiffness by measuring the peak load required for a 4.5 cm diameter hemispherically shaped foot to crush a 9"×9" piece of film shaped into an approximately 6.5 cm diameter by 6.5 cm tall inverted cup while the cup shaped film is surrounded by an approximately 6.5 cm diameter cylinder to maintain a uniform deformation of the cup shaped film. The foot and the cup are aligned to avoid contact between the cup walls and the foot which might affect the peak load. The peak load is measured while the foot descends at a rate of about 0.25 inches per second (15 inches per minute) utilizing a Model FTD-G-500 load cell (500 gram range) available from the Schaevitz Company, Tennsauken, N.J.

As used herein, the term "polymer" generally includes, but is not limited to, homopolymers, copolymers, such as, for example, block, graft, random and alternating copolymers, terpolymers, etc. and blends and modifications thereof. Furthermore, unless otherwise specifically limited, the term "polymer" shall include all possible geometrical configurations of the material. These configurations include, but are not limited to, isotactic, syndiotactic and random symmetries.

As used herein, the term "consisting essentially of" does not exclude the presence of additional materials which do not significantly affect the desired characteristics of a given composition or product. Exemplary materials of this sort would include, without limitation, pigments, surfactants, waxes, flow promoters, particulates and materials added to enhance processability of the composition.

SUMMARY OF THE INVENTION

The problems described above are addressed by the process of the present invention which is directed to a process for manufacturing a water-based adhesive bonded, solvent resistant protective laminate. The process is composed of the following steps: 1) providing a film having a first surface and a second surface; 2) depositing a discontinuous coating of a cross-linkable, carboxylated styrene-butadiene rubber latex adhesive on the first surface of the film, the cross-linkable adhesive containing an effective amount of a cross-linking agent; 3) joining a fibrous non-woven web into intimate bonding contact with the film and adhesive; and 4) removing water from the adhesive thereby causing cross-linking at reactive sites. According to one embodiment of the process of the present invention, the film and/or the nonwoven web may be elongated or stretched during the joining step. For example, the film or the nonwoven web may be elongated by a few percent (e.g., 2 or 3 percent).

In one aspect of the present invention, the process may be composed of the following additional steps: 1) depositing a discontinuous coating of a cross-linkable, carboxylated styrene-butadiene rubber latex adhesive on the second surface of the film, the cross-linkable adhesive containing an effective amount of a cross-linking agent; 3) joining a fibrous nonwoven web into intimate bonding contact with the adhesive on the second surface of the film; and 4) removing water from the adhesive thereby causing cross-linking at reactive sites.

According to the present invention, the discontinuous coating of adhesive may be deposited on the first and/or second surface of the film (e.g., both surfaces) utilizing gravure-based printing techniques. Alternatively and/or additionally, the adhesive may be applied by spraying, spattering, dripping or similar techniques. Generally speaking, the discontinuous coating of adhesive is deposited at a rate greater than about 2 grams per square meter of film. For example, the discontinuous coating of adhesive may be deposited at a rate of from about 3 to about 30 grams per square meter of film. Desirably, the discontinuous coating of adhesive is deposited at a rate of from about 4 to about 15 grams per square meter of film.

According to one aspect of the present invention, cross-linkable, carboxylated styrene-butadiene rubber latex adhesive (blended with an effective amount of cross-linking agent) having a viscosity of from about 250 to about 2000 centipoise is deposited on the film. For example, the blend of cross-linkable, carboxylated styrene-butadiene rubber latex adhesive and cross-linking agent has a viscosity of from about 750 to about 1500 centipoise. Desirably, the blend of cross-linkable, carboxylated styrene-butadiene rubber latex adhesive and cross-linking agent has a viscosity of from about 1000 to about 1500 centipoise. The carboxylated styrene-butadiene rubber latex may have a solids content of about 40 to about 60 percent, by weight. For example, the carboxylated styrene-butadiene rubber latex may have a solids content of about 50 percent, by weight. A multi-functional isocyanate cross-linking agent may be added at a rate of from about 2.5 to about 7.5 percent, based on the dry weight of the carboxylated styrene-butadiene rubber. For example, a multi-functional isocyanate cross-linking agent may be added at a rate of about 5 percent, based on the dry weight of the carboxylated styrene-butadiene rubber. Removing water from the adhesive latex causes cross-linking at reactive sites in the adhesive. Removal of water can be accomplished at ambient temperatures or at elevated temperatures.

The present invention also encompasses a water-based adhesive bonded, solvent resistant protective laminate produced by the process described above. In one aspect of the invention, the film component of the laminate may be a film composed of a thermoset polymer. The film component may also be a film composed of a thermoplastic polymer. Desirably, the film component is a film composed of a thermoplastic polymer selected from polyethylene, polypropylene, polybutene, ethylene copolymers, polypropylene copolymers and butene copolymers and blends of the same.

According to one aspect of the invention, the film may be microporous, microapertured or have enhanced diffusivity. The film may be a temperature-sensitive film. The film may an average thickness ranging from about 0.25 to about 30 mils. For example, the film may have an average thickness ranging from about 0.8 to about 10 mils. The surface of the film may be modified by chemical etching, chemical oxidation, ion bombardment, plasma treatments, flame treatments, heat treatments, and/or corona discharge treatments prior to application of adhesive to enhance adhesive bonding between the plies.

The nonwoven fibrous web component of the laminate may be selected from bonded carded webs, spunbonded webs, webs of meltblown fibers, multi-ply fibrous webs containing the same type of fibrous web, and multi-ply fibrous webs containing different types of fibrous webs. In one aspect of the invention, the nonwoven fibrous web may be treated so that the nonwoven fabric has stretch and recovery properties.

According to the invention, the water-based adhesive bonded, solvent resistant protective laminate should have an adhesion strength prior to exposure to liquid solvent or solvent vapor of greater than about 120 grams (per two inch width of sample). For example, the laminate may have a pre-exposure adhesion strength of from about 150 grams to 1000 grams or more. Desirably, the laminate has a pre-exposure adhesion strength of from about 250 grams to 900 grams. More desirably, the laminate has an adhesion strength such that the nonwoven web component is destroyed before the plies delaminate.

Generally speaking, the water-based adhesive bonded, solvent resistant protective laminate of the present invention has an adhesion strength greater than about 75 grams when measured after five (5) minutes immersion in a solvent. Desirably, the adhesion strength will be greater than about 125 grams. More desirably, the adhesion strength will be greater than about 175 grams. In some situations, it has been found useful to express solvent resistance as a ratio between adhesion strength measured prior to solvent exposure (i.e., "dry-state") and "solvent exposed" adhesion strength. In those situations, the water-based adhesive bonded, solvent resistant laminate material should have a "solvent exposed" adhesion strength that is at least 10 percent of the "dry state" adhesion strength required to cause destruction of the nonwoven during adhesion strength testing. Desirably, the laminate's "solvent exposed" adhesion strength is at least 20 percent of the "dry state" adhesion strength required to cause destruction of the nonwoven during adhesion strength testing. More desirably, the laminate's "solvent exposed" adhesion strength is at least 30 percent of the "dry state" adhesion strength required to cause destruction of the nonwoven during adhesion strength testing.

The present invention also encompasses a process for manufacturing a water-based adhesive bonded, solvent resistant protective laminate in which the adhesive is deposited on a fibrous nonwoven web which is then joined to a film. In one aspect of the invention, the process may have the following steps: 1) providing a fibrous nonwoven web having a first surface and a second surface; 2) depositing a discontinuous coating of a cross-linkable, carboxylated styrene-butadiene rubber latex adhesive on the first surface of the fibrous nonwoven web, the cross-linkable adhesive containing an effective amount of a cross-linking agent; 3) joining a film into intimate bonding contact with the fibrous nonwoven web and adhesive; and 4) removing water from the adhesive thereby causing cross-linking at reactive sites. One aspect of the present invention encompasses a water-based adhesive bonded, solvent resistant protective laminate produced by the process described above.

The present invention further encompasses a process for manufacturing a water-based adhesive bonded, solvent resistant protective laminate that includes a temperature-sensitive film component. The method includes the following steps: 1) providing a temperature-sensitive film having a first surface and a second surface; 2) depositing a discontinuous coating of a cross-linkable, carboxylated styrene-butadiene rubber latex adhesive on the first surface of the film, the latex adhesive containing an effective amount of a cross-linking agent; 3) joining a fibrous nonwoven web into intimate bonding contact with the film and adhesive to form a laminate; and 4) removing water from the adhesive to cause cross-linking at reactive sites at a temperature sufficiently low to avoid degrading the temperature-sensitive film.

Desirably, the temperature of the laminate during removal of water is at least 5 percent less than the temperature (measured in degrees Centigrade) sufficient to cause 5 percent areal shrinkage of the temperature-sensitive film. More desirably, the temperature of the laminate during removal of water is at least 15 percent less than the temperature (measured in degrees Centigrade) sufficient to cause 5 percent areal shrinkage of the film. For example, if the temperature-sensitive film is a microporous polyethylene film (e.g., Exxaire™ Breathable Film available from Exxon Chemical Company of Lake Zurich, Ill.), it is desirable that the temperature of the laminate be less than about 75° Centigrade during the step of removing water from the adhesive to cause cross-linking at reactive sites. More desirably, the temperature may be less than about 70° Centigrade during the step of removing water from the adhesive to cause cross-linking at reactive sites.

In one aspect of the present invention, the process may be composed of the following additional steps: 1) depositing a discontinuous coating of a cross-linkable, carboxylated styrene-butadiene rubber latex adhesive on the second surface of the temperature-sensitive film, the cross-linkable adhesive containing an effective amount of a cross-linking agent; 3) joining a fibrous nonwoven web into intimate bonding contact with the adhesive on the second surface of the film to form a laminate; and 4) removing water from the adhesive to cause cross-linking at reactive sites at a temperature sufficiently low to avoid degrading the temperature-sensitive film.

The present invention further encompasses a water-based adhesive bonded, solvent resistant protective laminate (incorporating a temperature-sensitive film) produced by the process described above.

DETAILED DESCRIPTION OF THE INVENTION

Figure 1:
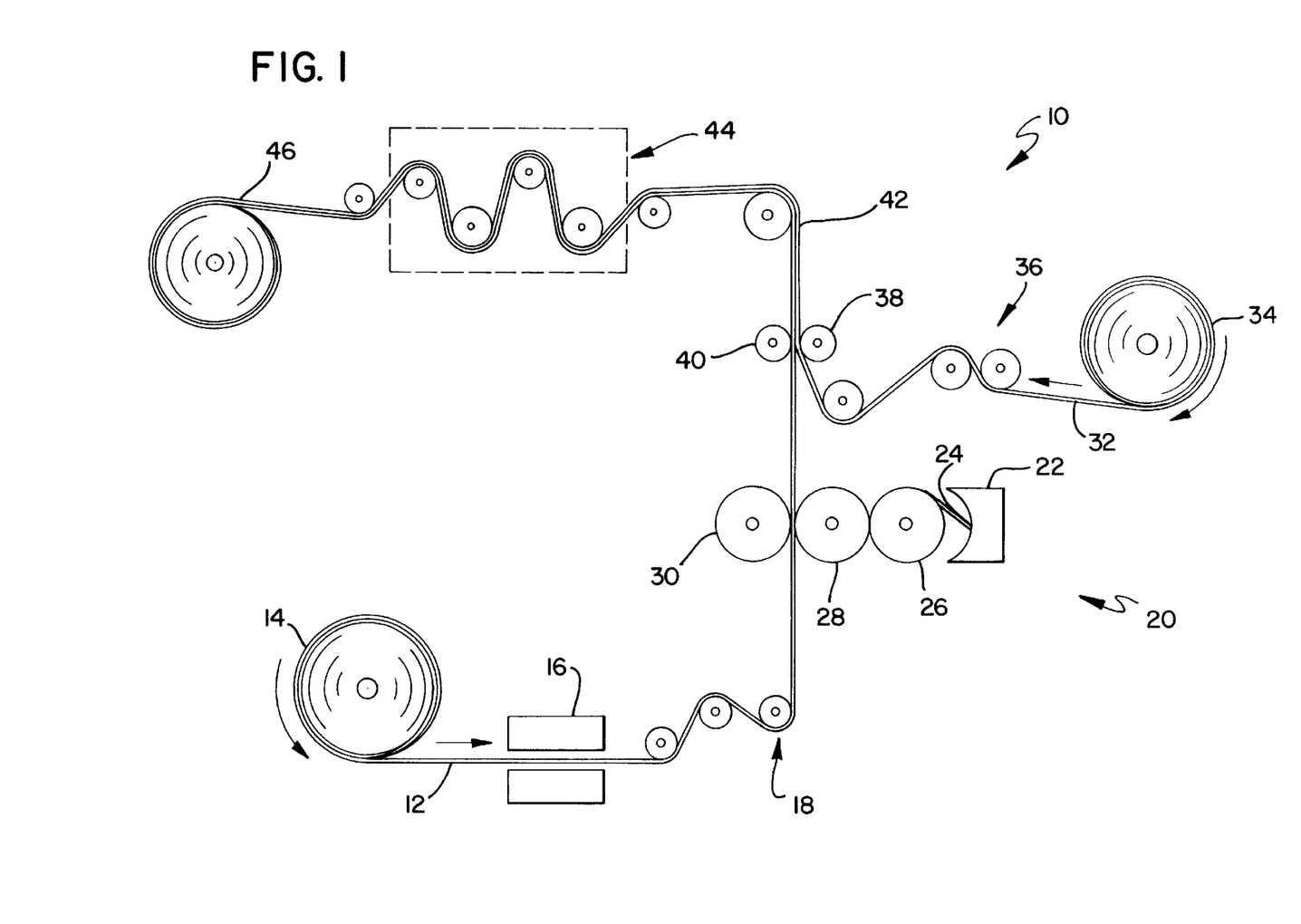
FIG. 1 is an illustration of an exemplary process for making an adhesively bonded, solvent resistant protective laminate.

Referring to the drawing and in particular to FIG. 1, there is shown at 10 an exemplary process of making the water-based adhesive bonded solvent resistant film/nonwoven protective laminate the present invention.

According to the present invention, film 12 is unwound from a supply roll 14 and travels in the direction indicated by the arrow associated therewith as the supply roll 14 rotates in the direction of the arrows associated therewith. The film 12 may be formed by one or more film extrusion processes and passed directly into the process 10 without first being stored on a supply roll 14.

The film may be passed through a pre-treatment station 16 to modify the surface of the film. For example, the film may be calendered with a flat roll, point bonded or pattern bonded in order to achieve desired physical and/or textural characteristics. Additionally, at least a portion of the surface of the film may be modified by various known surface modification techniques prior to application of adhesive to enhance adhesive bonding between the plies. Exemplary surface modification techniques include, for example, chemical etching, chemical oxidation, ion bombardment, plasma treatments, flame treatments, heat treatments, and/or corona discharge treatments. Desirably, the film 12 is subjected to corona discharge treatments.

The film 12 passes through the nip of an S-roll arrangement 18 in a reverse-S path. From the S-roll arrangement 18, the film 12 passes to a gravure printing arrangement 20. The gravure printing arrangement contains an adhesive tank 22 and a doctor blade 24 which is used to apply adhesive to a gravure roll 26. The gravure roll 26 is engraved with a conventional continuous parallel groove pattern which spirals around the roll (not shown). While conventional continuous groove patterns work well, it is contemplated that other conventional patterns such as, for example, closed cell or notch patterns may be used. Each continuous groove holds a small amount of adhesive which is released in a discontinuous pattern onto a rubber applicator roll 28. The film 12 passes through a nip between the rubber applicator roll 28 and a cooperating backup roll 30. The adhesive is transferred from the applicator roll 28 to the surface of the film 12. The speeds of the gravure roll 26 and the applicator roll 28 may be controlled so they are the same or so they differ by a minor amount to influence the application of adhesive.

A nonwoven web 32 is unwound from a supply roll 34 and travels in the direction indicated by the arrow associated therewith as the supply roll 34 rotates in the direction of the arrows associated therewith. The nonwoven web 32 may be formed by one or more nonwoven material manufacturing processes such as, for example, meltblowing processes, spunbonding processes or carding and bonding processes and passed directly into the process 10 without first being stored on a supply roll 34.

The nonwoven web 32 may be passed through a pretreatment station (not shown) to modify the surface of the web. For example, the surface of the nonwoven web 32 may be modified by chemical etching, chemical oxidation, ion bombardment, plasma treatments, flame treatments, heat treatments, corona discharge treatments and the like to enhance adhesive bonding between the plies. Alternatively and/or additionally, the nonwoven web 32 may be treated with liquids to reduce static buildup and/or other phenomena which may be associated with fibrous nonwoven webs.

The nonwoven web 32 passes through the nip of an S-roll arrangement 36 in a reverse-S path. From the S-roll arrangement 36, the nonwoven web 32 passes to a bonding arrangement composed of a pair of bond rolls 38 and 40. The bond rolls 38 and 40 are used to join the nonwoven web 32 into intimate bonding contact with the film 12 and adhesive thereby forming a water-based adhesive bonded solvent resistant protective film/nonwoven laminate 42.

According to one embodiment of the process of the present invention, the film and/or the nonwoven web may be elongated or stretched during the joining step. For example, the film or the nonwoven web may be elongated by a few percent (e.g., 2 to 3 percent or more). This may be accomplished by controlling the peripheral linear speed of the rollers of the S-roll arrangement 18 and/or 36 to be less than the peripheral linear speed of the rollers 38 and 40 of the bonder roller arrangement. Due to the difference in speeds, the film 12 and/or the nonwoven web 32 is tensioned between their respective S-roll arrangement and the pressure nip of the bonder roll arrangement. By adjusting the difference in the speeds of the rollers, the film 12 and/or the nonwoven web 32 is tensioned so that it is elongated a desired amount and is maintained in such tensioned, elongated condition while the film 12 is joined to the nonwoven web 32 during their passage through the bonder roller arrangement to form the protective laminate 42.

The laminate 42 may be passed through an optional drying operation 44 before being wound onto a storage roll 46. The drying operation may operate at ambient temperature or include the use of heat to ensure a dry material is wound onto the storage roll 46. Removing water from the blend of adhesive latex and cross-linking agent causes cross-linking to take place at reactive sites in the adhesive. A separate drying step is not necessary to keep the plies from separating during processing because latex adhesive has sufficient initial levels of tack to keep the laminate from separating during normal handling and the cross-linking reactions will occur at ambient temperature as water evaporates. However, it still may be desirable to have a separate drying operation to speed up the occurrence of cross-linking and/or to allow increased processing speeds. Exemplary drying operations include processes which incorporate infrared radiation, yankee dryers, steam cans, microwaves, hotair and/or through-air drying techniques, and ultrasonic energy.

In embodiments of the present invention that incorporate one or more temperature-sensitive films into the laminate, the water may be removed from the adhesive in the laminate to cause cross-linking at reactive sites at a temperature sufficiently low to avoid degrading the temperature-sensitive film. Desirably, the temperature of the laminate (i.e., temperature of the temperature-sensitive film component) during removal of water is at least 5 percent less than the temperature (measured in degrees Centigrade) sufficient to cause 5 percent areal shrinkage of the temperature-sensitive film. More desirably, the temperature of the laminate (i.e., temperature of the temperature-sensitive film component) during removal of water is at least 15 percent less than the temperature (measured in degrees Centigrade) sufficient to cause 5 percent areal shrinkage of the film. Of course, water may be removed from the adhesive in the laminate at ambient conditions (e.g., standard room temperatures and humidities).

For example, if the temperature-sensitive film is a microporous polyethylene film (e.g., Exxaire™ Breathable Film available from Exxon Chemical Company of Lake Zurich, Ill.), it is desirable that the temperature of the laminate (i.e., temperature of the temperature-sensitive film component) be less than about 75° Centigrade during the step of removing water from the adhesive to cause cross-linking at reactive sites. More desirably, the temperature may be less than about 70° Centigrade during the step of removing water from the adhesive to cause cross-linking at reactive sites.

It should be understood that, during the step of removing water from the adhesive to cause cross-linking at reactive sites, the environment surrounding the laminate containing a temperature-sensitive film may be greater than the temperature at which the film degrades. It is important only that the temperature-sensitive film itself does not reach the critical degradation temperature. This may be accomplished by exposing the laminate to the heated environment for only a very short time so the temperature-sensitive component is only partially heated and reaches a temperature less than that of the heated environment.

According to the present invention, the process described above may include additional steps such that adhesive is deposited on both surfaces of the film and nonwoven webs are joined to each surface. More particularly, the process may include the following additional steps: 1) depositing a discontinuous coating of a cross-linkable, carboxylated styrene-butadiene rubber latex adhesive on the second surface of the film, the cross-linkable adhesive containing an effective amount of a cross-linking agent; 3) joining a fibrous nonwoven web into intimate bonding contact with the adhesive on the second surface of the film; and 4) removing water from the adhesive thereby causing cross-linking at reactive sites. The present invention also encompasses a process for manufacturing a water-based adhesive bonded, solvent resistant protective laminate in which the adhesive is deposited on a fibrous nonwoven web which is then joined to a film. For example, the process may have the following steps: 1) providing a fibrous nonwoven web having a first surface and a second surface; 2) depositing a discontinuous coating of a cross-linkable, carboxylated styrene-butadiene rubber latex adhesive on the first surface of the fibrous nonwoven web, the cross-linkable adhesive containing an effective amount of a cross-linking agent; 3) joining a film into intimate bonding contact with the fibrous nonwoven web and adhesive; and 4) removing water from the adhesive thereby causing cross-linking at reactive sites.

According to the present invention, the discontinuous coating of water-based adhesive is desirably deposited via conventional gravure printing techniques. Desirably, the water-based adhesive is a carboxylated styrene-butadiene rubber latex adhesive which is cross-linkable utilizing a minor amount of an multi-functional isocyanate. An exemplary carboxylated styrene-butadiene rubber latex adhesive is available from the Dow Chemical Company, Europe, under the trade designation xz94444.02. Desirably, the carboxylated styrene-butadiene rubber latex will have a solids content of about 40 to about 60 percent, by weight. For example, the carboxylated styrene-butadiene rubber latex may have a solids content of about 50 percent. A multi-functional isocyanate cross-linking agent may be added at a rate of about 2.5 to about 7.5 percent, based on the dry weight of the carboxylated styrene-butadiene rubber latex adhesive. For example, a multi-functional isocyanate cross-linking agent may be added at a rate of about 5 percent, based on the dry weight of the carboxylated styrene-butadiene rubber latex adhesive.

An exemplary multi-functional isocyanate cross-linking agent is available from BASF, Ludwigshaven, Germany, under the trade designation Basonat® F DS 3425. This multi-functional isocyanate has an isocyanate content of about 18.0 to about 18.5 percent.

The cross-linkable, carboxylated styrene-butadiene rubber latex adhesive (blended with an effective amount of cross-linking agent) should have a viscosity that is compatible with a high-speed gravure printing process. Desirably, the blend of latex adhesive and cross-linking agent will have a viscosity of from about 250 to about 2000 centipoise. More desirably, the blend of latex adhesive and cross-linking agent has a viscosity of from about 750 to about 1500 centipoise. Even more desirably, the blend of latex adhesive and cross-linking agent has a viscosity of from about 1000 to about 1500 centipoise.

Generally speaking, the discontinuous coating of adhesive is deposited at a rate greater than about 2 grams per square meter of film. For example, the discontinuous coating of adhesive may be deposited at a rate of from about 3 to about 30 grams per square meter of film. Desirably, the discontinuous coating of adhesive is deposited at a rate of from about 4 to about 15 grams per square meter of film. The discontinuous nature of the adhesive coating serves to preserve the breathability of the laminate if such materials are used. A solid film or layer of adhesive could block pores, apertures or other mechanisms designed to provide breathability to a material. The discontinuous nature of the adhesive coating also serves to help the material retain its conformability. A solid film or layer of adhesive could impart stiffness or rigidity to a material.

The present invention also encompasses a water-based adhesive bonded, solvent resistant protective laminate produced by the process or processes described above. The protective laminates of the present invention may be manufactured so inexpensively that they may be considered disposable after a single or limited use. The laminates of the present invention may advantageously contain heat sensitive components, very thin films and/or components which were poorly suited to conventional bonding techniques. Such protective laminate materials have practical application in disposable protective apparel such as, for example, disposable protective coveralls and/or medical gowns.

In one aspect of the invention, the film component of the laminate may be a film composed of a thermoset polymer. The film component may also be a film composed of a thermoplastic polymer. Desirably, the film component is a film composed of a thermoplastic polymer selected from polyethylene, polypropylene, polybutene, ethylene copolymers, polypropylene copolymers and butene copolymers and blends of the same.

According to the invention, the film may be a conventional film (i.e., a film that is not microporous, not microapertured or not having enhanced diffusivity), a microporous film, a microapertured film or a film having enhanced diffusivity. Microporous, microapertured films and/or films having enhanced diffusivity may be desirable for certain applications because they can be used to provide a material having desirable physical characteristics such as, for example, air and/or vapor permeability. Generally speaking, any method of forming microporous and/or microapertured film may be used to treat the film before it is laminated.

Various microporous films and methods of making such films are known in the art. For example, microporous films are disclosed in U.S. Pat. Nos. 3,967,367 and 3,795,720, the contents of which are incorporated by reference. An exemplary microporous or breathable film is available from the Exxon Chemical Company under the trade designation Exxaire™. This film is available in thicknesses ranging from about 1 to over 2 mils; Gurley air permeability (sec/100 cc) 200–800; and Water Vapor Transmission Rate $(gm/m^2/24 \ hrs.)$ 4000–10000. Generally speaking, it is desirable for the film component of the laminate to have a thickness of at least about 1 mil and a water vapor transmission rate greater than about 100 $gm/m^2/24$ hours. For example, the film may provide a water vapor transmission rate greater than about 500 $gm/m^2/24$ hours. Desirably, the film may provide a water vapor transmission rate greater than about 750 $gm/m^2/24$ hours.

Different types of microapertured films and microaperturing processes have been developed and may be used in the practice of the present invention. For example, films are disclosed in U.S. patent application Ser. No. 07/769,050 entitled "Hydrosonically Microapertured Thin Thermoset Sheet Materials"; U.S. patent application Ser. No. 07/769,047 entitled "Hydrosonically Microapertured Thin Thermoplastic Sheet Materials"; U.S. patent application Ser. No. 07/768,788 entitled "Hydrosonically Microapertured Thin Naturally Occurring Polymeric Sheet Materials and Method of Making the Same"; and U.S. patent application Ser. No. 07/769,045 entitled "Process For Hydrosonically Microaperturing Thin Sheet Materials". All of these applications are assigned to the assignee of the present application and are hereby incorporated by reference.

Generally speaking, such hydrosonically microapertured films may be made by a method which involves the application of ultrasonic vibrations to a material where the area of such application has had a liquid applied thereto to the extent that the liquid is present in sufficient quantity to generally fill the gap between the tip of the ultrasonic horn and the surface of the material. The method of hydrosonic microaperturing includes the steps of: (1) placing a film on a pattern anvil having a pattern of raised areas where the height of the raised areas is greater than the thickness of the film; (2) conveying the film, while placed on the pattern anvil, through an area where a fluid is applied to the film; and (3) subjecting the film to ultrasonic vibrations in the area where the fluid is applied to the film. As a result of this method, the film is microapertured in a pattern generally the same as the pattern of raised areas on the pattern anvil.

The area of the microapertures in the microapertured films may generally range from at least about 10 square micrometers to about 100,000 square micrometers. For example, the area of each of the formed microapertures may generally range from at least about 10 square micrometers to about 5,000 square micrometers. More particularly, the area of each of the formed microapertures may generally range from at least about 10 square micrometers to about 1,000 square micrometers. Even more particularly, the area of each of the formed microapertures may generally range from about at least 10 square micrometers to about 100 square micrometers.

The film may be microapertured with a microaperture density of at least about 1,000 microapertures per square inch. For example, the film may be microapertured with a microaperture density of at least about 5,000 microapertures per square inch. More particularly, the film may be microapertured with a microaperture density of at least about 20,000 microapertures per square inch. Even more particularly, the film be microapertured with a microaperture density of at least about 90,000 microapertures per square inch. Yet even more particularly, the film may be microapertured with a microaperture density of at least about 160,000 microapertures per square inch. In some embodiments it may be desirable for the microaperturing of the film to be confined to a predesignated area or areas of the film.

Other films that can be used in the present invention may contain valve systems that respond to changes in pressure such as disclosed in U.S. patent application Ser. No. 07/768,782 entitled "Pressure Sensitive Valve System and Process For Forming Said System". Films having portions which have been thinned but not apertured may also be used in the present invention. Such film are disclosed in, for example, U.S. patent application Ser. No. 07/767,727 entitled "Process For Hydrosonically Area Thinning Thin Sheet Materials".

The film component of the laminate may have an average thickness ranging from about 0.25 to about 15 mils. For example, the film may have an average thickness ranging from about 0.25 to about 10 mils. Desirably, the film will have a thickness ranging from about 0.5 mil to about 3.0 mil. More desirably, the film will have a thickness ranging from about 1.0 mil to about 2.5 mil.

Some types of microporous, microapertured and/or thin films have latent internal stresses resulting from their respective film manufacturing processes. These internal stresses can render such films susceptible to shrinkable when exposed to temperatures capable of softening the films. For example, the Exxaire™ film described above is reported has having a measured film shrinkage after a three minute exposure to a hot air oven at 170° F. (76.7° C.) of less than about 5 percent in both the machine and cross-machine directions of the film. Unfortunately, at higher temperatures (e.g., 248° F. ⁻120° C.), the level of shrinkage may approach 70 percent.

The nonwoven fibrous web component of the laminate may be selected from bonded carded webs, spunbonded webs, webs of meltblown fibers, multi-ply fibrous webs containing the same type of fibrous web, and multi-ply fibrous webs containing different types of fibrous webs. If the nonwoven web is a web of meltblown fibers, it may include meltblown microfibers. These nonwoven webs may be formed from thermoplastic polymers or thermoset polymers. If the nonwoven web is formed from a polyolefin, the polyolefin may be polyethylene, polypropylene, polybutene, ethylene copolymers, propylene copolymers and butene copolymers. Desirably, the polyolefin may be a random block copolymer of propylene and ethylene which contains about 3 percent or more, by weight, ethylene. The fibers and/or filaments may be formed from blends that contain various pigments, additives, strengthening agents, flow modifiers and the like. Such fabrics are described in U.S. Pat. Nos. 4,041,203, 4,374,888, and 4,753,843, the contents of which are incorporated herein by reference. Those patents are assigned to the Kimberly-Clark Corporation, the assignee of the present invention.

The nonwoven web may also be a composite material made of a mixture of two or more different fibers or a mixture of fibers and particulates. Such mixtures may be formed by adding fibers and/or particulates to the gas stream in which meltblown fibers are carried so that an intimate entangled commingling of meltblown fibers and other materials, e.g., wood pulp, staple fibers and particulates such as, for example, activated carbon, silica, and hydrocolloid (hydrogel) particulates commonly referred to as superabsorbant materials, occurs prior to collection of the meltblown fibers upon a collecting device to form a coherent web of randomly dispersed meltblown fibers and other materials such as disclosed in U.S. Pat. No. 4,100,324, the disclosure of which is hereby incorporated by reference.

Generally speaking, the fibrous material in the nonwoven web should be joined by interfiber bonding to form a coherent web structure. Interfiber bonding may be produced by entanglement between individual meltblown fibers, carded fibers and/or spunbond filaments. Some fiber entangling is inherent in the meltblown process, bonding-carding process and/or spunbond process but may be generated or increased by processes such as, for example, hydraulic entangling or needlepunching. Alternatively and/or additionally a bonding agent may be used to increase the desired bonding.

The nonwoven web component of the laminate may have a basis weight ranging from about 15 gsm to about 150 gsm. For example, the nonwoven web component may have a basis weight ranging from about 25 gsm to about 100 gsm. Desirably, the nonwoven web component of the high strength barrier fabric may have a basis weight ranging from about 20 gsm to about 75 gsm.

An exemplary water-based adhesive bonded, solvent resistant protective laminate produced by the process described above may have a total basis weight ranging from about 25 grams per square meter (gsm) to about 200 gsm. For example, the protective laminate may have a basis weight ranging from about 50 gsm to about 150 gsm. Although the basis weight of the laminate will vary depending on the materials used, lower basis weight materials are desirable for comfort and conformability and higher basis weight materials are desirable for toughness and durability. The film-nonwoven web protective laminate construction permits combinations of materials providing high strength at relatively low basis weights.

It is contemplated that the water-based adhesive bonded, solvent resistant protective laminate may also be treated with liquid compositions such as, for example, Zepel® and Zelec®, available from E. I. du Pont De Nemours to improve resistance to liquid and reduce static buildup.

EXAMPLES 1–9

Examples were prepared generally in accordance with the process described above. A 1 mil (approx. 21.75 grams per square meter) polyethylene film available from the Exxon Chemical Company under the trade designation Exxaire™ 10B04 was unwound from a supply roll. The film was passed through a conventional corona discharge treater drawing the amperage indicated in Table 1 under the column heading "CORONA ON FILM (amp)". The corona discharge treated film entered a conventional gravure printing operation composed of a metal gravure roll and a rubber applicator roll. The metal gravure roll rotated at a speed which differed from the speed of the rubber applicator roll. The ratio of the gravure roll/applicator roll speeds is expressed in Table 1 under the column heading "SPEED RATIO (%)".

The gravure roll was engraved with a conventional continuous parallel groove pattern which spiraled around the roll. The groove pattern was designed to deposit a discontinuous pattern of adhesive at a rate which may be varied from about 3 to about 12 grams per square meter. The actual level of deposited glue for each sample is reported in Table 1 under the column heading "GLUE AMOUNT (g/m$^2$)". The glue was a blend of a carboxylated styrene-butadiene rubber latex adhesive and a multi-functional isocyanate cross-linking agent. The carboxylated styrene-butadiene rubber latex adhesive was obtained from the Dow Chemical Company, Europe, under the trade designation xz94444.02. The latex adhesive had a solids content of about 50 percent, by weight.

The latex adhesive was blended with a multi-functional isocyanate cross-linking agent available from BASF, Ludwigshaven, Germany, under the trade designation Basonat® F DS 3425. The multi-functional isocyanate had an isocyanate content of about 18.0 to about 18.5 percent. The multi-functional isocyanate cross-linking agent was added at a rate of about 5 percent, based on the dry weight of the carboxylated styrene-butadiene rubber latex adhesive. The blend of cross-linkable, carboxylated styrene-butadiene rubber latex adhesive and cross-linking agent had a viscosity ranging from about 1000 to about 1500 centipoise.

The nonwoven component used in the laminate samples was a polypropylene spunbonded nonwoven web which contained a light coating or deposit of meltblown fibers (about 1 gram per square meter) across the interior portion of the web. The nonwoven web had a total basis weight of about 41 grams per square meter and was treated with Zelec® static repellent (available from E. I. du Pont De Nemours) at an add-on rate of about 0.3 percent, by weight. The spunbond/meltblown web was obtained from the Kimberly-Clark Corporation of Neenah, Wis. The adhesive coated film and the nonwoven web were joined at the nip of a smooth bonder roller arrangement and then passed to a conventional hot air dryer. The approximate dryer temperature used for each sample is reported in Table 1 under the column heading "DRYER TEMPERATURE (°C.)".

Samples measuring two inches in width (except for samples 1A and 2A) were tested for adhesion strength utilizing a standard test for Peel Resistance of Adhesives (T-Peel Test). The samples were tested generally in accordance with ASTM D 1876-72 (Reapproved 1983). Testing of the protective laminates was conducted after cross-linking had occurred. Some samples were tested after a five (5) minute immersion in a solvent. The test instrument was an Instron Model 4301 Universal Test Instrument. The Instron jaw was set to travel at a rate of 8 inches per minute. The results of testing (i.e., the adhesion strength) are reported in units of force per unit of width. The results of adhesion testing of samples not exposed to a solvent are reported in Table 2 under the column heading "DRY". Results of adhesion testing of samples exposed to isopropyl alcohol, diesel oil and an aliphatic hydrocarbon solvent are reported in Table 2 under the column headings "IPA", "DIESEL", and "M.T.X. 100", respectively. The hydrocarbon solvent is an aliphatic hydrocarbon with a specific gravity of ca. 0.764 g/cm$^3$ available under the trade designation RIVOLTA M.T.X. 100 from Bremer & Leguil GmbH, Germany.

Additional testing of Samples 1A and 2A was conducted. In particular, adhesion strength for the samples tested after immersion in ethanol is reported in Table 3 adjacent the row heading "Ethanol". Adhesion strength for the samples tested after immersion in water heated to 80° C. is reported in Table 3 adjacent the row heading "80° C. water". Grab tensile strength measurements were taken utilizing the Instron Test Equipment generally in accordance with Method 5100 of Federal Test Method Standard No. 191A. Tensile strength refers to the maximum load or force (i.e., peak load) encountered while elongating the sample to break. Measurements of peak load were made in both the machine direction (MD) and cross-machine directions (CD). Tear strength (i.e., trapezoidal tear strength) of samples was measured in accordance with ASTM Standard Test D 1117-14. The tensile strength and tear strength results reported in Table 3 are expressed in units of force (kilograms$_f$). Resistance to liquid penetration (i.e., hydrostatic head) was determined in accordance with the standard hydrostatic pressure test AATCCTM No. 127-1977. A water vapor permeability index was determined utilizing the "Gore Cup" test method. The "Gore Cup" method is a procedure developed by the Forschungsinstitut Hohenstein, Schloss Hohenstein, Bonnigheim, Germany—Department of Clothing Physiology and is identified as Bekleidungs Physiologisches Institut E. V. Hohenstein Standard Test Specification BPI 1.4—"Determination of Stationary Water Vapor Resistance by Means of the Cup Method". The results of this test method correlate well with DIN 54 101 T1 (German) which is a more precise "skin model" test.

TABLE 1

| SAMPLE | SPEED RATIO (%) | CORONA ON FILM (AMPS) | DRYER TEMP (° C.) | GLUE AMOUNT (G/M$^2$) |
|---|---|---|---|---|
| 1 | 70 | 1.4 | 70 | 3 to 11 |
| 2 | 30 | 4.0 | 100 | 7.0 |
| 3 | 40 | 4.0 | 100 | 5.3 |
| 4 | 50 | 4.0 | 100 | 5.3 |
| 5 | 60 | 4.0 | 100 | 3.2 |
| 6 | 70 | 4.0 | 100 | 7.3 |
| 7 | 90 | 4.0 | 100 | 5.0 |
| 8 | 90 | 4.0 | 100 | 5.2 |
| 9 | 110 | 4.0 | 100 | 6.0 |
| 1A | 100 | 4.0 | 70 | 7.6 |
| 2A | 100 | 2.0 | 70 | 7.4 |

TABLE 2

LAMINATE BOND STRENGTH - "ADHESION STRENGTH" TESTING
(reported in grams per 2 inches of sample width)

| SAMPLE | DRY | IPA | DIESEL | M.T.X. 100 |
|---|---|---|---|---|
| 1 | 144–273 | 80 | 48 | 20 |
| 2 | 195 | 26 | 43 | 67 |
| 3 | 185 | 17 | 24 | 47 |
| 4 | 150 | 28 | 15 | 44 |
| 5 | 113 | 18 | 15 | |
| 6 | 147 | 13 | 21 | 62 |
| 7 | 341 v.z. | 25 | 20 | 54 |
| 8 | 121 | 20 | 19 | 20 |
| 9 | 269 | 28 | 22 | 18 |
| 1A* | 1380 | 455 | 125 | 120 |
| 2A* | 1230 | 520 | 175 | 170 | v.z. = Spunbond tearing
*= reported in grams per 3 inches of sample width

TABLE 3

|  | SAMPLE 1A | SAMPLE 2A |
| --- | --- | --- |
| Laminate basis weight (g/m$^2$) | 70.1 | 69.9 |
| Nominal film basis weight (g/m$^2$) | 21.8 | 21.8 |
| Nominal nonwoven basis weight (g/m$^2$) | 40.7 | 40.7 |
| Calculated adhesive weight (g/m$^2$) | 7.6 | 7.4 |
| Adhesion strength (grams) (3" Strip) | | |
| Ethanol | 290 | 305 |
| 80° C. water | very good | very good |
| Tear Strength (kg) | | |
| MD | 2.3 | 2.7 |
| CD | 2.9 | 2.7 |
| Grab Tensile (kg) | | |
| MD | 11.3 | 11.9 |
| CD | 10.6 | 10.7 |
| Hydrostatic Head (cm) | 95+ | 95+ |
| Water vapor permeability index (g/m$^2$ · Hour · mbar) (Gore cup) | 8.8 | 9.1 |

As can been seen from the test data, the water-based adhesive bonded, solvent resistant protective laminate should have an adhesion strength prior to exposure to liquid solvent or solvent vapor of greater than about 120 grams per two inch width of sample. For example, when normalized to a two inch sample width, the adhesion strengths of samples 1A and 2A were about 920 grams and 820 grams, respectively. Accordingly, protective laminates of the present invention may have a pre-exposure adhesion strength of from about 200 grams to 900 grams or more. Desirably, the laminate has an adhesion strength such that the nonwoven web component is destroyed before the plies delaminate.

From the results reported in Tables 2 and 3, the water-based adhesive bonded, solvent resistant protective laminate of the present invention may have an adhesion strength greater than about 75 grams when measured after five (5) minutes immersion in a solvent. In some cases, the adhesion strength will be greater than about 125 grams. Desirably, the adhesion strength will be greater than about 175 grams. In some situations, it has been found useful to express solvent resistance as a ratio between adhesion strength measured prior to solvent exposure (i.e., "dry-state") and "solvent exposed" adhesion strength. When expressed in that manner, the water-based adhesive bonded, solvent resistant laminate material should have a "solvent exposed" adhesion strength that is at least 10 percent of the "dry state" adhesion strength required to cause destruction of the nonwoven during adhesion strength testing.

EXAMPLES 10–17

Examples were prepared generally in accordance with the process described above for Examples 1–9. A 1 mil (approx. 21.75 grams per square meter) polyethylene film available from the Exxon Chemical Company under the trade designation Exxaire™ 10B04 was unwound from a supply roll. The film was passed through a conventional corona discharge treater and then was entered into a conventional gravure printing operation composed of a metal gravure roll and a rubber applicator roll. The level of glue deposited on each sample and the type of glue/cross-linking agent was essentially as described for Examples 1–9.

The nonwoven component used in the laminate samples was a polypropylene spunbonded nonwoven web essentially as described for Examples 1–9. The adhesive coated film and the nonwoven web were joined at the nip of a smooth bonder roller arrangement and then passed through a conventional hot air dryer at a specified line speed.

The approximate line speed for each sample is reported in Table 4 under the column heading "SPEED (m/min)". The approximate dryer temperature used for each sample is reported in Table 4 under the column heading "DRYER TEMPERATURE (°C.)".

The temperature of the laminate was measured at a point approximately 2 to 3 meters after the point where the laminate exits the dryer. Laminate temperature measurements were made utilizing a "RANGER II" infra-red temperature sensor available from RAYTEK of Mountain View, Calif. The approximate temperature measured for each laminate sample is reported in Table 4 under the column heading "LAMINATE TEMPERATURE (°C.)". The readings reported in Table 4 compare favorably with readings of 55° C. taken immediately (i.e., not 2 to 3 meters after the exit point) as the laminate left a dryer that circulated air heated to about 80–87° C.

Each of the samples (i.e., Samples 10–17) processed under these conditions appeared to be free of more than a nominal amount of shrinkage (i.e., less than about 2 or 3 percent) as well as puckering, gathering or other flaws that could be attributed to overheating of the temperature-sensitive film.

A brief experiment was run to determine the temperature-sensitivity of the Exxaire™ 10B04 microporous polyethylene film (1 mil—approx. 21.75 grams per square meter).

Samples of film were cut to dimensions of about 9 inches in length (along the machine direction) and about 2 inches in width (along the cross-machine direction). Each sample was laid flat on the bottom surface of a circulating air oven pre-heated to the specified temperature. After one minute of exposure, each sample was removed from the oven, allowed to cool briefly and the dimensions were measured. The particular placement of the sample and exposure period were selected because they were thought to provide adequate transfer of heat from the oven to the film.

The areal shrinkage was calculated by dividing the area lost during the oven exposure by the original area and is expressed as a percentage. As can be seen from the results reported in Table 5, the areal shrinkage at 70° C. and 80° C. compared favorably with the shrinkage performance reported by the film manufacturer. At higher temperatures (e.g., 90° C.–120° C.), the areal shrinkage is at a level that appears to be unacceptable for many laminating processes and laminated products.

TABLE 4

| Sample | (m/min) Speed | Dryer Temp(° C.) | Laminate Temp(° C.) |
| --- | --- | --- | --- |
| 10 | 60 | 80 | 36 |
| 11 | 60 | 80 | 38 |
| 12 | 60 | 80 | 36 |
| 13 | 60 | 79 | 40 |
| 14 | 75 | 86 | 33 |
| 15 | 75 | 85 | 38 |
| 16 | 75 | 87 | 40 |
| 17 | 75 | 86 | 37 |

TABLE 5

| Temp(° C.) | Areal Shrinkage(%) |
|---|---|
| 70 | 2 |
| 80 | 3 |
| 90 | 13 |
| 120 | 70 |

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

What is claimed is:

1. A process of manufacturing a water-based adhesive bonded, solvent resistant protective laminate comprising:
    providing a microporous, polyolefin-based film having a first surface and a second surface, said film having an areal shrinkage of greater than about 5 percent at temperatures greater than about 100 degrees Centigrade;
    depositing a discontinuous coating of a water-based, crosslinkable, carboxylated styrene-butadiene rubber latex adhesive on the first surface of the polyolefin-based film, the latex adhesive containing an effective amount of a crosslinking agent;
    joining a fibrous nonwoven web selected from the group consisting of bonded carded webs, spunbonded webs, meltblown fiber webs and combinations thereof, into intimate contact with the polyolefin-based film to form a laminate; and
    removing water from the adhesive thereby causing crosslinking at a temperature at least 5 percent less than the temperature sufficient to cause 5 percent areal shrinkage of the polyolefin-based film, and not greater than about 100° C.;
    resulting in an adhesive bonded, solvent resistant protective laminate having a dry adhesion strength greater than about 120 grams per two inches, measured using ASTM D1876-72.

2. The process of claim 1, wherein the discontinuous coating of adhesive is deposited utilizing gravure printing techniques.

3. The process of claim 1, wherein the discontinuous coating of adhesive is deposited at a rate greater than about 2 grams per square meter of film.

4. The process of claim 3, wherein the discontinuous coating of adhesive is deposited at a rate of from about 3 to about 30 grams per square meter of film.

5. The process of claim 1, wherein the cross-linkable, carboxylated styrene-butadiene rubber latex adhesive containing an effective amount of cross-linking agent has a viscosity of from about 250 to about 2000 centipoise.

6. The process of claim 1, wherein the cross-linkable, carboxylated styrene-butadiene rubber latex adhesive containing an effective amount of cross-linking agent has a viscosity of from about 250 to about 2000 centipoise.

7. The process of claim 1, wherein the surface of the film is treated utilizing a surface modification technique selected from chemical etching, chemical oxidation, ion bombardment, plasma treatments, flame treatments, heat treatments, and corona discharge treatments.

8. The process of claim 1, wherein the carboxylated styrene-butadiene rubber latex has a solids content of about 40 to about 60 percent, by weight.

9. The process of claim 1, wherein the carboxylated styrene-butadiene rubber latex contains from about 2.5 to about 7.5 percent, of a multi-functional isocyanate cross-linking agent, based on the dry weight of the carboxylated styrene-butadiene rubber.

10. The process of claim 1, wherein the temperature of the laminate during removal of water is at least 15 percent less than the temperature sufficient to cause 5 percent areal shrinkage of the temperature-sensitive film.

11. The process of claim 1 further comprising the steps of:
    depositing a discontinuous coating of a crosslinkable, carboxylated styrene-butadiene rubber latex adhesive on the second surface of the polyolefin-based film, the crosslinkable adhesive containing an effective amount of a crosslinking agent;
    joining a fibrous nonwoven web into intimate bonding contact with the adhesive on the second surface of the polyolefin-based film to form a laminate; and
    removing water from the adhesive thereby causing crosslinking at reactive sites at a temperature at least 5 percent less than the temperature sufficient to cause 5 percent areal shrinkage of the polyolefin-based film.

12. A water-based adhesive bonded, solvent resistant protective laminate produced by the process of claim 1.

13. The protective laminate of claim 12, wherein the film component is a film composed of a thermoplastic polymer.

14. The protective laminate of claim 12, wherein the film component is a film composed of a thermoplastic polymer selected from polyethylene, polypropylene, polybutene, ethylene copolymers, polypropylene copolymers and butene copolymers and blends of the same.

15. The protective laminate of claim 12, wherein the film is a microapertured film.

16. The protective laminate of claim 12, wherein the film has an average thickness ranging from about 0.25 to about 30 mils.

17. The protective laminate of claim 16, wherein the film has an average thickness ranging from about 0.8 to about 10 mils.

18. The protective laminate of claim 12, wherein the laminate has an adhesion strength such that the nonwoven web component is destroyed before the plies delaminate.

19. A water-based adhesive bonded, solvent resistant protective laminate produced by the process of claim 11.

20. A process of manufacturing a water-based adhesive bonded, solvent resistant protective laminate comprising:
    providing a temperature-sensitive polyolefin-based, microporous film having a first surface and a second surface, said microporous film having an areal shrinkage of greater than about 5 percent at temperatures greater than about 80 degrees Centigrade;
    depositing a discontinuous coating of a water-based, crosslinkable, carboxylated styrene-butadiene rubber latex adhesive on the first surface of the temperature-sensitive, microporous film, the latex adhesive containing an effective amount of a crosslinking agent;
    joining a fibrous nonwoven web selected from the group consisting of bonded carded webs, spunbonded webs, meltblown fiber webs and combinations thereof, into intimate bonding contact with the temperature-sensitive, microporous film and adhesive to form a laminate; and
    removing water from the adhesive to cause crosslinking at reactive sites at temperatures less than about 80 degrees Centigrade;

resulting in an adhesive bonded, solvent resistant protective laminate having a dry adhesion strength greater than about 120 grams per two inches, measured using ASTM D1876-72.

21. The process of claim 20, wherein the temperature of the laminate during removal of water is at least 15 percent less than the temperature sufficient to cause 5 percent areal shrinkage of the temperature-sensitive film.

22. The process of claim 20, further comprising the steps of:
depositing a discontinuous coating of a cross-linkable, carboxylated styrene-butadiene rubber latex adhesive on the second surface of the temperature-sensitive, microporous film, the cross-linkable adhesive containing an effective amount of a cross-linking agent;
joining a fibrous nonwoven web into intimate bonding contact with the adhesive on the second surface of the temperature-sensitive, microporous film to form a laminate; and
removing water from the adhesive to cause cross-linking at reactive sites at a temperature less than about 80 degrees Centigrade.

23. A water-based adhesive bonded, solvent resistant protective laminate produced by the process of claim 20.

24. A water-based adhesive bonded, solvent resistant protective laminate produced by the process of claim 22.

25. The process of claim 1, wherein the polyolefin-based film is a microporous polyethylene film.

26. The process of claim 20, wherein the temperature sensitive film is a microporous polyethylene film.

27. A nonwoven composite fabric comprising:
a breathable thermoplastic polyolefin-based film having at least one film surface adhesively bonded to a layer of nonwoven thermoplastic polyolefin material;
the bonding occurring at multiple spaced apart locations through the agency of a water-based crosslinkable, carboxylated styrene-butadiene latex adhesive material which has been dried at not more than about 100° C. to yield a dry adhesion strength greater than about 120 grams per two inches, measured using ATM D1876-72;
the breathable film having a thickness of at least about 1.0 mil and an MVTR of greater than about 500 grams/m$^2$–24 hours;
the nonwoven layer including a nonwoven fibrous polyolefin web having a basis weight of about 15–150 grams/m$^2$.

28. The nonwoven composite fabric of claim 27, wherein both surfaces of the film are adhesive bonded to layers of nonwoven thermoplastic materials.

29. The nonwoven composite fabric of claim 27, wherein the film comprises a thermoplastic polyolefin selected from the group consisting of polyethylene, polypropylene, polybutene, ethylene copolymers, propylene copolymers, butene copolymers and combinations thereof.

30. The nonwoven composite fabric of claim 29, wherein the film comprises polyethylene.

31. The nonwoven composite fabric of claim 27, wherein the nonwoven fibrous web has a basis weight of at least about 25 grams/m$^2$.

32. The nonwoven composite fabric of claim 28, wherein each nonwoven fibrous web has a basis weight of at least about 25 grams/m$^2$.

33. The nonwoven composite fabric of claim 27, wherein the nonwoven fibrous web has a basis weight of at least about 40 grams/m$^2$.

34. The nonwoven composite fabric of claim 27, wherein the nonwoven fibrous web comprises a spunbonded web.

35. The nonwoven composite fabric of claim 27, wherein the nonwoven fibrous web comprises a thermoplastic polyolefin selected from the group consisting of polyethylene, polypropylene, polybutene, ethylene copolymers, propylene copolymers, butene copolymers and combinations thereof.

36. The nonwoven composite fabric of claim 35, wherein the nonwoven fibrous web comprises polypropylene.

37. The nonwoven composite fabric of claim 27, wherein the nonwoven fibrous web further comprises an antistatic agent.

38. The nonwoven composite fabric of claim 27, wherein the adhesive comprises a discontinuous coating of a crosslinkable, carboxylated styrene-butadiene rubber latex and a crosslinking agent.

39. The nonwoven composite fabric of claim 27, wherein the adhesive is present at greater than about 2 grams/m$^2$.

40. The nonwoven composite fabric of claim 27, wherein the adhesive is present at about 3–30 grams/m$^2$.

41. The nonwoven composite fabric of claim 27, wherein the adhesive is present at about 4–15 grams/m$^2$.

42. The nonwoven composite fabric of claim 27, wherein the adhesive is applied using a gravure printing technique.

43. The nonwoven composite fabric of claim 27, wherein the adhesive is applied by spraying.

44. The nonwoven composite fabric of claim 27, wherein the adhesive is applied by spattering.

45. The nonwoven composite fabric of claim 27, wherein the adhesive is applied by dripping.

46. A nonwoven composite fabric, comprising:
a microporous thermoplastic polyolefin-based film having at least one film surface adhesively bonded to a layer of nonwoven thermoplastic material;
the bonding occurring at multiple spaced apart locations through the agency of a water-based crosslinkable, carboxylated styrene-butadiene latex adhesive material which has been dried at not more than about 100° C. to yield a dry adhesion strength greater than about 120 grams per two inches, measured using ASTM D1876-72;
the microporous film having a thickness of at least about 1 mil and an MVTR of greater than about 500 grams/m$^2$–24 hours;
the nonwoven layer including a spunbond web having a basis weight of at least about 40 grams/m$^2$.

47. The nonwoven composite fabric of claim 46, wherein the microporous film comprises polyethylene.

48. The nonwoven composite fabric of claim 46, wherein the spunbond web comprises polypropylene.

49. The nonwoven composite fabric of claim 46, wherein the spunbond web is coated with meltblown fibers.

50. The nonwoven composite fabric of claim 46, wherein the nonwoven layer further comprises an antistatic agent.

51. The nonwoven composite fabric of claim 46, wherein the adhesive is present in a pattern of spaced apart lines.

52. The nonwoven composite fabric of claim 46, wherein the adhesive comprises a carboxylated styrene butadiene rubber latex and a crosslinking agent.

53. The nonwoven composite fabric of claim 46, having a grab tensile strength of at least about 10 kg.

54. A process for forming an adhesive bonded nonwoven composite fabric including a continuous thermoplastic breathable polyolefin-based film having a thickness of at least about 1 mil and an MVTR of greater than about 500 grams/m$^2$–24 hours, and a continuous thermoplastic polyolefin nonwoven web having a basis weight of about 15–150 grams/m$^2$, the process comprising:
unwinding the continuous thermoplastic polyolefin web and the continuous thermoplastic breathable polyolefin-based film;

inserting a water-based, crosslinkable, carboxylated styrene-butadiene latex adhesive bonding material at multiple spaced apart locations between the continuous thermoplastic polyolefin web and the continuous thermoplastic polyolefin-based film;

contacting a side of the continuous thermoplastic polyolefin web adjacent to the adhesive bonding material with a side of the continuous thermoplastic polyolefin-based film; and curing the adhesive by drying it at not more than about 100° C., to yield a dry adhesion strength greater than about 120 grams per two inches, measured using ASTM D1876-72.

55. The process of claim 54, wherein the thermoplastic polyolefin web comprises polypropylene.

56. The process of claim 54, wherein the thermoplastic breathable polyolefin-based film comprises polyethylene.

57. The process of claim 54, wherein the thermoplastic breathable polyolefin-based film comprises polypropylene.

58. The process of claim 54, wherein the contacted web and film are adhesively bonded at multiple spaced apart locations comprised of points.

59. The process of claim 54, wherein the contacted web and film are adhesively bonded at multiple spaced apart locations comprised of patterned lines.

60. The process of claim 54, wherein the nonwoven web has a basis weight of at least about 25 grams/m$^2$.

61. The process of claim 54, wherein the nonwoven web has a basis weight of at least about 40 grams/m$^2$.

62. The process of claim 54, wherein the nonwoven web comprises a spunbond web.

63. The process of claim 54, wherein the nonwoven web comprises polypropylene.

64. The process of claim 54, wherein the adhesive is applied at greater than about 2 grams/m$^2$.

65. The process of claim 54, wherein the adhesive is applied at about 3–30 grams/m$^2$.

66. The process of claim 54, wherein the adhesive is applied at about 4–15 grams/m$^2$.

67. A process for forming an adhesive-bonded composite nonwoven fabric including a continuous thermoplastic microporous polyolefin-based film having a thickness of at least about 1 mil and an MVTR of greater than about 500 grams/m$^2$–24 hours, and a continuous thermoplastic spunbond web having a basis weight of at least about 40 grams/m$^2$, the process comprising:

unwinding the continuous thermoplastic spunbond web and the continuous thermoplastic microporous polyolefin-based film;

inserting a water-based, crosslinkable, carboxylated styrene-butadiene latex adhesive bonding material at multiple spaced apart locations between the continuous thermoplastic spunbond web and the continuous thermoplastic polyolefin-based film;

contacting a side of the continuous thermoplastic spunbond web adjacent to the adhesive bonding material with a side of the continuous thermoplastic polyolefin-based film; and curing the adhesive by drying it at not more than about 100° C., to yield a dry adhesion strength greater than about 120 grams per two inches, measured using ASTM D1876-72.

68. The process of claim 67, wherein the spunbond web comprises polypropylene.

69. The process of claim 67, wherein the film comprises polyethylene.

70. The process of claim 67, wherein the spunbond web is coated with a layer of meltblown fibers.

71. The process of claim 67, wherein the contacted web and film are adhesively bonded at multiple spaced-apart locations comprised of points.

72. The process of claim 67, wherein the contacted web and film are adhesively bonded at multiple spaced apart locations comprised of patterned lines.

73. The process of claim 67, wherein the adhesive is applied at about 3–30 grams/m$^2$.

74. The process of claim 67, wherein the adhesive is applied at about 4–15 grams/m$^2$.

75. A nonwoven composite fabric comprising:

a microporous thermoplastic polyolefin-based film having at least one film surface adhesively bonded to a layer of nonwoven thermoplastic material, the bonding occurring at multiple spaced-apart locations through the agency of a water-based crosslinkable, carboxylated styrene-butadiene rubber latex adhesive material which has been dried at not more than about 100° C. to yield a dry adhesion strength greater than about 120 grams per two inches measured using ASTM D1876-72;

said composite fabric having a barrier to passage of biological liquid when the composite fabric is subjected to contact with synthetic blood at zero psi for 5 minutes followed by synthetic blood contact at 2 psi (13.6 kPa) for one minute followed by synthetic blood contact at zero psi for fifty-four minutes, said composite fabric exhibiting no visible penetration of synthetic blood;

said nonwoven composite fabric having a moisture vapor transmission rate of greater than about 450 grams per square meter for twenty-four hours at about 75° F. and about 65% relative humidity; and said nonwoven composite fabric having a breaking strength of at least about 14 pounds per inch.

76. A nonwoven composite fabric according to claim 75, wherein the thermoplastic microporous film has a thermoplastic nonwoven layer of the same or different materials adhesive bonded to a first surface of the microporous film and a second surface of the microporous film.

77. A nonwoven composite fabric according to claim 75, wherein said thermoplastic nonwoven comprises polyolefins or copolymers of polyolefins.

78. A nonwoven composite fabric according to claim 75, wherein said thermoplastic nonwoven layers is spun-bonded and have grab strengths in machine direction of at least 6.5 pounds to break, and in the cross direction of at least 5 pounds to break.

79. A nonwoven composite fabric according to claim 76, wherein the thermoplastic nonwoven materials have individual layer weights of at least 0.2 ounces per square yard to about 2.5 ounces per square yard.

80. A nonwoven fabric according to claim 76, wherein the moisture or vapor transmission is unaffected or enhanced when the nonwoven layer on a first surface of the microporous film includes anti-static components and the nonwoven composite fabric continues to provide a barrier to passage of biological liquids contacted to a nonwoven layer bonded to a second microporous film surface.

81. A nonwoven composite fabric according to claim 76, wherein the first and second layer of thermoplastic nonwoven materials bonded to a first and a second surface of the microporous film are comprised of polyolefins.

82. A nonwoven composite fabric according to claim 76, wherein the microporous film is comprised of polyethylene and the individual layers of nonwoven are comprised of the same or different polyolefins.

83. A nonwoven composite fabric according to claim 76, wherein the individual nonwoven layers are comprised of the same or different polyolefins and are adhesively bonded to a first and second surface of a polypropylene microporous film.

84. A process for forming an adhesive bonded nonwoven composite fabric having a moisture vapor transmission rate of greater than about 240 grams per square meter for 24 hours at about 75° F. and about 65% relative humidity, said fabric providing a barrier to passage of biological liquid when the composite fabric is subjected to contact with synthetic blood at 0 psi for 5 minutes followed by synthetic blood contact at 2 psi (13.6 kPa) for 1 minute followed by synthetic blood contact at 0 psi for 54 minutes, said composite fabric exhibiting no visible penetration of the synthetic blood; said composite fabric having a breaking strength of at least 14 pounds per inch;

said process comprising:

unwinding at least one continuous thermoplastic nonwoven web and at least one continuous thermoplastic microporous polyolefin-based film;

inserting a water-based, crosslinkable, carboxylated styrene-butadiene rubber latex adhesive bonding material at multiple spaced-apart locations between the continuous thermoplastic nonwoven web and the continuous thermoplastic microporous film;

contacting a side of the at least one thermoplastic nonwoven web adjacent to said adhesive bonding material with a side of the continuous thermoplastic microporous film; and continuously transporting said contacted web and film adjacent to said adhesive bonding material through an adhesive curing zone, said curing zone providing a drying temperature not greater than about 100° C. and dwell time sufficient to cure said adhesive without degrading either the film or web, to yield a dry adhesion strength greater than about 120 grams per two inches, measured using ASTM D1876-72.

85. The process according to claim 84, including two of the continuous thermoplastic nonwoven webs comprised of the same or different polyolefins.

86. The process according to claim 84, wherein the microporous polyolefin film is comprised of polyethylene.

87. The process according to claim 84, wherein the microporous polyolefin film is comprised of polypropylene.

88. The process according to claim 84, wherein the contacted web and film are adhesively bonded at multiple spaced-apart locations comprised of points.

89. The process according to claim 84, wherein the contacted web and film are adhesively bonded at multiple spaced-apart locations comprised of patterned lines.

90. A nonwoven composite fabric comprising:

a microporous thermoplastic polyolefin-based film having at least one film surface adhesively bonded to a layer of nonwoven thermoplastic material, the bonding occurring at multiple spaced-apart locations through the agency of a water-based, crosslinkable, carboxylated styrene-butadiene rubber latex adhesive material which has been dried at not more than about 100° C. to yield a dry adhesion strength greater than about 120 grams per two inches, measured using ASTM D1876-72;

said composite fabric having a barrier to passage of biological liquid when the composite fabric is subjected to contact with synthetic blood at zero psi for 5 minutes followed by synthetic blood contact at 2 psi (13.6 kPa) for one minute followed by synthetic blood contact at zero psi for fifty-four minutes, said composite fabric exhibiting no visible penetration of synthetic blood;

the composite fabric providing a barrier to viral penetration when the composite fabric is subject to contact with ØX174 bacteriophage suspension at a titer of $10^8$ PFU/mL for 5 minutes with no applied pressure, 1 minute at 2 psi and 54 minutes with no applied pressure; and said nonwoven composite fabric having a moisture vapor transmission rate of greater than about 450 grams per square meter for twenty-four hours at about 75° F. and about 65% relative humidity.

91. A nonwoven composite fabric according to claim 90, comprising thermoplastic nonwoven layers of the same or different materials adhesive bonded to a first surface of the microporous film and a second surface of the microporous film.

92. A nonwoven composite fabric according to claim 90, wherein said thermoplastic nonwoven comprises polyolefins or copolymers of polyolefins.

93. A nonwoven composite fabric according to claim 91, wherein said thermoplastic nonwoven layers are spun-bonded, and have grab strengths in machine direction of at least 6.5 pounds to break, and in the cross-direction of at least 5 pounds to break.

94. A nonwoven composite fabric according to claim 91, wherein a first and second layer of thermoplastic nonwoven materials have individual layer weights of at least 0.2 ounces per square yard to about 2.5 ounces per square yard.

95. A nonwoven composite fabric according to claim 91, wherein the moisture or vapor transmission is unaffected or enhanced when the nonwoven layer on a first surface of the microporous film includes anti-static components and the nonwoven composite fabric continues to provide a barrier to passage of biological liquids contacted to a nonwoven layer on a second microporous film surface.

96. A nonwoven composite fabric according to claim 91, wherein the first and second layer of thermoplastic nonwoven materials bonded to a first and a second surface of polyolefin microporous film are comprised of polyolefins.

97. A nonwoven composite fabric according to claim 91, wherein the microporous film is comprised of polyethylene and the individual layers of nonwoven are comprised of the same or different polyolefins.

98. A nonwoven composite fabric according to claim 91, wherein the individual nonwoven layers are comprised of the same or different polyolefins and are adhesively bonded to first and second surfaces of a polypropylene microporous film.

99. A process for forming an adhesively bonded nonwoven composite fabric having a moisture vapor transmission rate of greater than 450 grams per square meter for 24 hours at about 75° F. and about 65% relative humidity, said fabric providing a barrier to passage of biological liquid when the composite fabric is subjected to contact with synthetic blood at 0 psi for five minutes followed by synthetic blood contact of 2 psi (13.6 kPa) for 1 minute followed by synthetic blood at 0 psi for 54 minutes, said composite fabric exhibiting no visible penetration of the synthetic blood; said composite fabric providing a barrier to viral penetration when the composite is subject to contact with ØX174 bacteriophage suspension at a titer of $10^8$ PFU/mL for five minutes with no applied pressure, one minute at 2 psi and fifty-four minutes with no applied pressure; said process comprising:

unwinding at least one continuous thermoplastic nonwoven web and at least one continuous thermoplastic microporous polyolefin-based film;

inserting a water-based, crosslinkable, carboxylated styrene-butadiene rubber latex adhesive bonding material at multiple spaced apart locations between the continuous thermoplastic nonwoven web and the continuous thermoplastic microporous film;

contacting a side of the at least one thermoplastic nonwoven web adjacent to said adhesive bonding material with a side of the continuous thermoplastic microporous film adjacent to said adhesive bonding material; and continuously transporting said contacting web and film adjacent to said adhesive bonding material through an adhesive bonding zone providing a drying temperature not greater than about 100° C. and a dwell-time sufficient to cure said adhesive without degrading either the film or web, to yield a dry adhesion strength greater than about 120 grams per two inches, measured using ASTM D1876-72.

100. A process according to claim 99, wherein the said composite fabric has a breaking strength of at least 14 pounds per inch.

101. The process according to claim 99, wherein the adhesive bonding materials inserted at multiple spaced apart locations is associated with the thermoplastic bonded nonwoven layer.

102. The process according to claim 99, wherein the insertion of bonding materials is achieved by a scatter coating on a surface of said nonwoven web or said microporous film.

103. The process according to claim 99, wherein the contacted web and film are adhesively bonded at multiple spaced apart locations comprised of points achieved by point coating of adhesive from an aqueous solution.

104. The process according to claim 99, wherein the contact web and film are adhesively bonded at multiple spaced apart locations in the form of patterned lines.

* * * * *